United States Patent [19]

Kaplan

[11] 4,107,680
[45] Aug. 15, 1978

[54] DIGITALLY PROCESSED RADAR SPEED SENSOR

[75] Inventor: Gerald Stanley Kaplan, Princeton, N.J.

[73] Assignee: RCA Corporation, New York, N.Y.

[21] Appl. No.: 737,777

[22] Filed: Nov. 1, 1976

[51] Int. Cl.² .......................... G01S 9/46; H01Q 1/32; H01Q 21/00
[52] U.S. Cl. .................... 343/8; 343/7 VM; 343/717; 343/879
[58] Field of Search ............... 343/7 VM, 8, 717, 879

[56] References Cited

U.S. PATENT DOCUMENTS

| 650,255 | 5/1900 | Kitsee | 343/879 X |
|---|---|---|---|
| 2,140,730 | 12/1938 | Batchelor | 343/879 X |
| 2,422,064 | 6/1947 | Anderson et al. | 343/8 |
| 2,426,228 | 8/1947 | Mackta | 343/8 |
| 3,277,430 | 10/1966 | Hagemann et al. | 343/8 X |
| 3,833,906 | 9/1974 | Augustine et al. | 343/8 X |
| 3,859,660 | 1/1975 | Augustine et al. | 343/8 X |
| 3,898,652 | 8/1975 | Rashid | 343/7 VM X |
| 3,918,058 | 11/1975 | Noyori et al. | 343/7 VM X |

Primary Examiner—Malcolm F. Hubler
Attorney, Agent, or Firm—H. Christoffersen; Joseph D. Lazar; John P. McMahon

[57] ABSTRACT

A Doppler speed sensor for a ground vehicle wherein errors due to vehicle tilt relative to the ground surface and initial mounting angle error are substantially eliminated by using a first antenna with its radiation pattern directed down and forward and a second antenna with its radiation pattern directed down and rearward, so the principal axes of the radiation patterns are 90° apart. A novel digital technique for processing the signals received from such antennas is also disclosed.

5 Claims, 5 Drawing Figures

DIGITALLY PROCESSED RADAR SPEED SENSOR

BACKGROUND OF THE INVENTION

1. Field of the Invention

The present invention relates to Doppler speed sensors.

2. Description of the Prior Art

Doppler radar speed sensors for surface vehicles typically use antennas mounted on the side of the vehicle towards the surface across which motion is to take place, such surface hereinafter being referred to as the "surface" or "ground surface". A probe signal is radiated from the antenna toward the surface to impinge on that surface at a predetermined angle of incidence. A portion of the probe signal is reflected from the surface back in the direction from which the probe signal came. Such reflected-back portion of the probe signal is referred to in the art as "backscatter". The remainder of the probe signal is either reflected in other directions or is absorbed by the ground surface. The amount of backscatter from a given surface, is affected by the parameters and radiation pattern of the probe signals, and by the characteristics of the surface. For example, the wavelength, power, and polarization of the radar probe; the area of the surface illuminated by the probe signal; the angle of incidence of the probe signal; permittivity and roughness of the surface all affect the amount and characteristics of backscatter from the surface. The frequency of the backscatter is Doppler-shifted from the frequency of the probe signal ($f_o$) in accordance with the speed of the relative motion between the vehicle and the surface. The backscatter is received by the radar, and the Doppler frequency shift thereof is determined to derive the relative speed.

Systems, utilizing a plurality of antennas are known. Such a system is described in U.S. Pat. No. 3,833,906, issued Sept. 3, 1974 to C. F. Augustine. The Augustine system comprises two "back-to-back" antennas in a "Janus" type configuration, respectively facing forward and rearward with non-overlapping radiation patterns. Each antenna serves to provide transmitting and receiving functions. The respective backscatter signal portions received by the antennas are added and subtracted to derive sum and difference signals, from which the Doppler speed is determined. "Vehicular Radar Speedometer" by Hyltin, Fuchser, Tyson and Regueiro, International Automotive Engineering Congress and Exposition, Jan. 1973 and "A Lightweight and Self-contained Airborne Navigational System" by Brown, Moody, Thompson, Bibby, Franklin, Ganton, and Mitchell, Proceedings of the IRE, Vol. 47, No. 5, May 1959, pp. 778-807 further describe the prior art. The antennas in Janus type systems typically maintain radiation patterns at the same absolute angle with respect to the underside of the vehicle. Thus, such systems are subject to errors due to relative tilt between the underside of the vehicle and the ground surface, occurring for example when the vehicle goes over a bump in the road.

The prior art systems generally require the antennas to be mounted such that their radiation patterns are in exact accord with a predetermined angle of incidence. To provide for faster and easier antenna installation, it is desirable that a speed sensor be relatively insensitive to angular mounting on the vehicle.

SUMMARY OF THE INVENTION

The present invention provides a Doppler speed sensor which is substantially insensitive to errors in mounting or vehicle tilt. Two antennas are deployed such that the principal axes of their radiation patterns are substantially 90° apart. A signal processor then generates a signal indicative of a mean value of the Doppler frequency shift.

DESCRIPTION OF A PREFERRED EMBODIMENT

Figure 1:
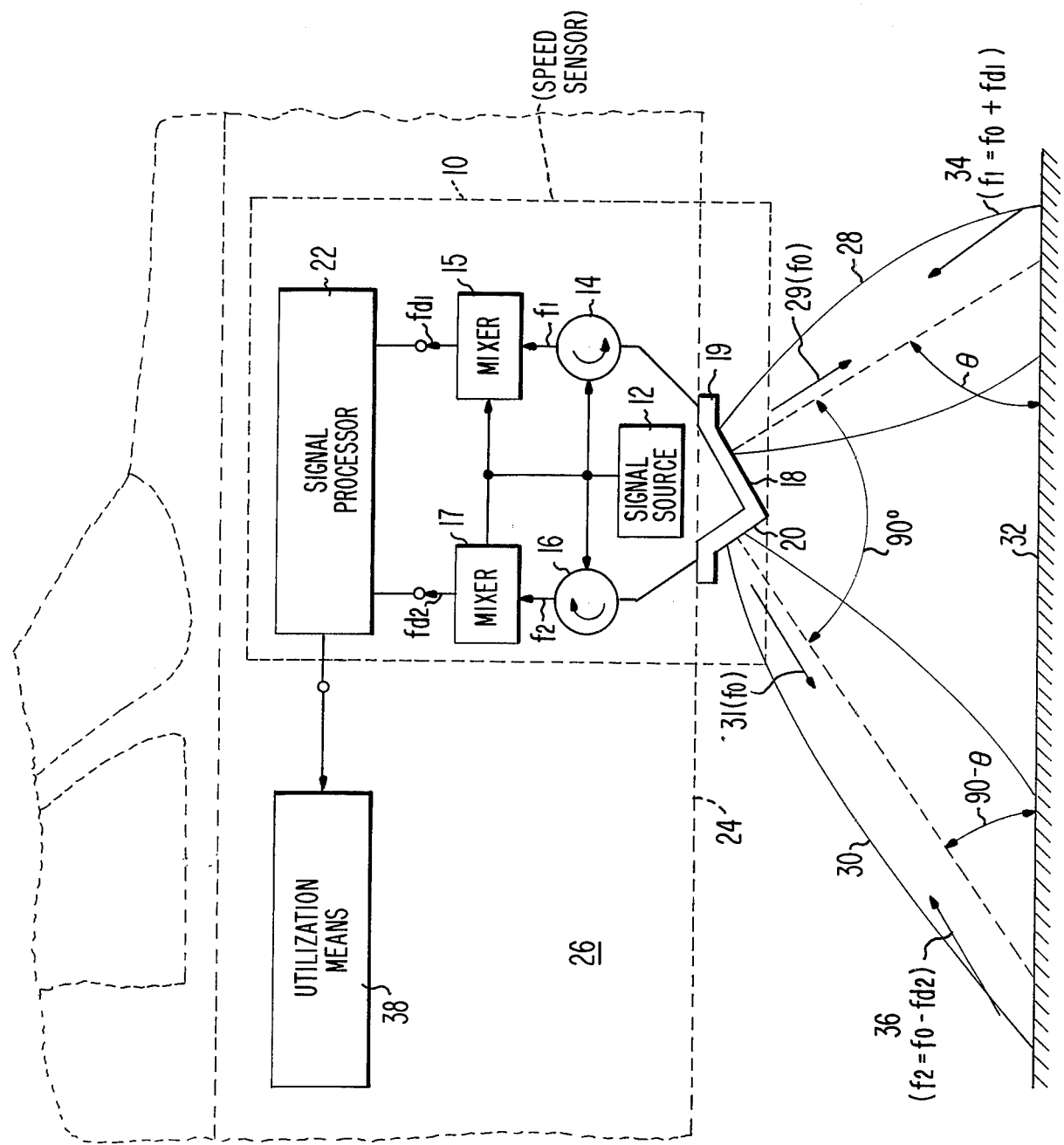
FIG. 1 is a schematic side view of a vehicle-mounted speed sensor in accordance with the present invention.

Referring to FIG. 1, a vehicular speed sensor 10 in accordance with the present invention comprises a conventional signal source 12, circulators 14 and 16, mixers 15 and 17 antennas 18 and 20. Speed sensor 10 further comprises a suitable signal processor 22, as will hereinafter be described. Antennas 18 and 20 are affixed to a mounting structure 19, such that the principal axes of their respective radiation patterns 28 and 30 are fixed at an angle of 90° apart. Mounting structure 19 will be more fully described in conjunction with FIG. 5. Mounting structure 19 is mounted on the underside 24 of a cooperating vehicle 26, such that the radiation pattern 28 of antenna 18 is directed forward and down towards a ground surface 32, and that the radiation pattern 30 of antenna 20 is directed rearward and down toward ground surface 32. Signal source 12 is respectively coupled to mixers 15 and 17 and, through circulators 14 and 16, to antennas 18 and 20.

Antennas 18 and 20 can be printed-circuit corporate-feed antennas such as described in U.S. Pat. No. 3,587,110 issued June 22, 1971 to O. Woodward, or can be conventional horn-type antennas. Antennas 18 and 20 radiate respective probe signals 29 and 31 of predetermined frequency $f_o$ having respective radiation patterns 28 and 30. Probe signals 29 and 31 illuminate portions of the ground surface 32, and signal portions, 34 and 36, are backscattered to the respective antennas 18 and 20. As will hereinafter be explained, the backscattered signals are Doppler shifted in accordance with the relative motion of vehicle 26 and ground surface 32. Backscattered signals 34 and 36 are received by antennas 18 and 20 and are routed through circulators 14 and 16 to mixers 15 and 17. Mixers 15 and 17 extract signals indicative of the respective Doppler shifts, and apply such signals to signal processor 22. Signal processor 22 operates, as will be explained, to translate the Doppler frequencies into an output signal indicative of the relative speed. Alternate embodiments of signal processor 22 will be more fully described in conjunction with FIGS. 2 and 3. Signal processor 22 is coupled to suitable utilization means 38 such as a dashboard readout or indicator.

In general, Doppler shift due to a reflection of a probe signal from an object moving with speed V relative to the probe signal source is in accordance with the following equation $$f_d = 2f_o/C \; V \cos \theta \qquad (1)$$

where $f_o$ is the frequency of the probe signal, C is the velocity of the light, and $\theta$ is the angle of incidence of the probe signal with respect to the ground surface. Thus, where vehicle 26 is moving at parallel velocity V with respect to ground surface 32 and the angle of incidence of probe signal 28 is $\theta$, antenna 18 is advancing with respect to the corresponding illuminated portion of ground surface 32. Accordingly, backscatter 34 is of a frequency $f_1$ as follows $$f_1 = f_o + f_{d_1} \qquad (2)$$

where $$f_{d_1} = 2f_o/C \; V \cos \theta \qquad (3)$$

Similarly, antenna 20 is receding from the portion of ground surface 32 illuminated by probe signal 31. Since radiation patterns 28 and 30 are fixed at 90° with respect to each other, the angle of incidence of probe signal 31 with respect to ground surface 32 is always $(90° - \theta)$. Thus, where vehicle 26 is moving with parallel velocity V with respect to ground surface 32, backscatter 36 of frequency $f_2$ in accordance with the following:

$$f_2 = f_o - f_{d_2} \qquad (4)$$

where $$f_{d_2} = 2f_o/C \; V \cos(90° - \theta) = 2f_o/C \; V \sin \theta \qquad (5)$$

Signal processor 22 generates an output signal indicative of a mean value of the Doppler frequency shifts $f_{d_1}$ and $f_{d_2}$. Such mean value signal is indicative velocity of vehicle 26 which is substantially independent of the angle of incidence of the probe signals, as will be explained.

For example, the so-called general mean or root mean square (rms) value of the Doppler frequencies may be generated by extracting the Doppler frequencies $f_{d_1}$ and $f_{d_2}$, squaring each frequency, summing the squares, and taking the square root of the average of the sum, as expressed mathematically in equation (6)

$$f_{out} = \sqrt{\frac{f_{d_1}^2 + f_{d_2}^2}{2}} = \frac{2f_o}{\sqrt{2}\;C} V \sqrt{\cos\theta^2 + \sin\theta^2} \qquad (6)$$
$$= \frac{\sqrt{2} f_o}{C} V$$

As shown in equation 6, the output frequency is an expression of velocity V independent of the probe signal angle of incidence, the independence deriving from the trigonometric identity $\cos^2\theta + \sin^2\theta = 1$.

Figure 2:
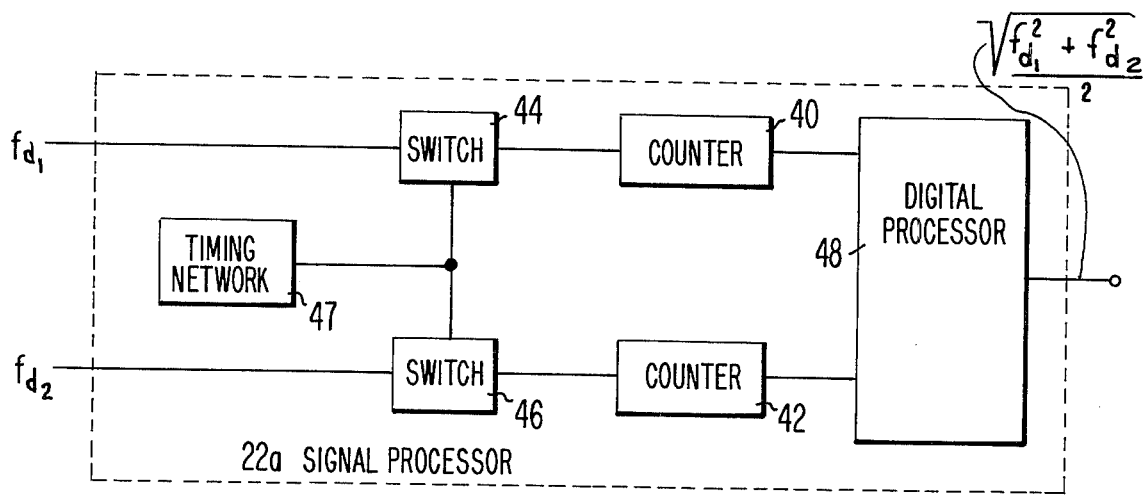
FIG. 2 is a block diagram of one embodiment of a signal processor in accordance with the present invention.

A signal processor 22a which provides a general mean (rms) output signal is depicted in FIG. 2. The Doppler frequencies $f_{d_1}$ and $f_{d_2}$ are detected and converted to a digital representation by, for example, respective gated counters 40 and 42 (reset signals not shown). The Doppler signals are applied to counters 40 and 42 respectively through switches 44 and 46. Switches 44 and 46 are controlled by a timing network 47, which operates to enable switches 44 and 46 for a predetermined period of time. Counters 40 and 42 develop counts respectively indicative of the number of cycles of $f_{d_1}$ and $f_{d_2}$ occurring within the predetermined period. The contents of counters 40 and 42 are thus indicative of the frequencies $f_{d_1}$ and $f_{d_2}$, and are applied to a suitable digital processor 48, such as an RCA COSMAC microprocessor, which performs the rms function.

Figure 3:
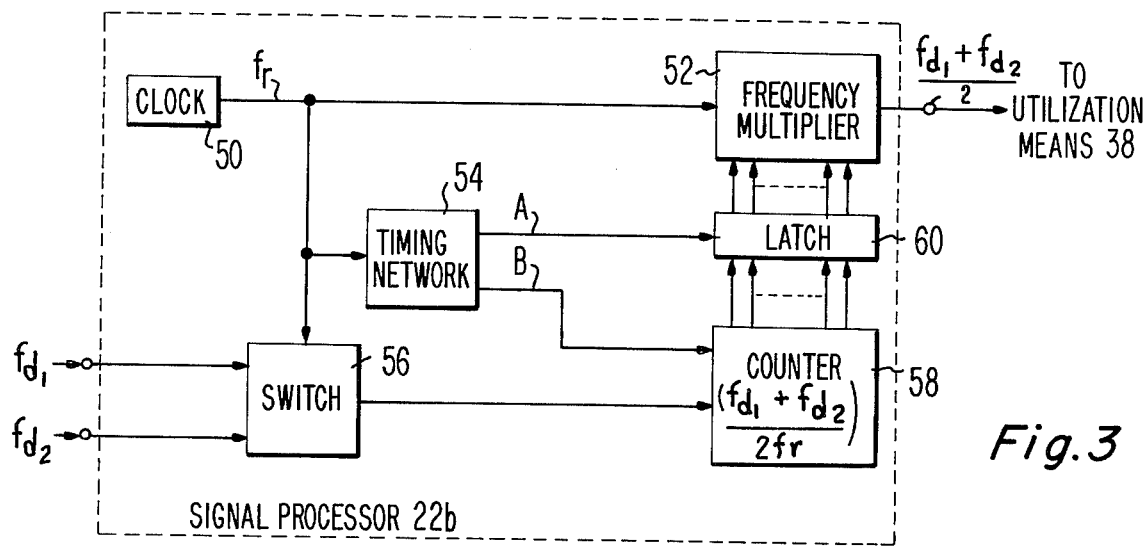
FIG. 3 is a block diagram of an alternative embodiment of a signal processor in accordance with the present invention.

An alternate form 22b of signal processor 22 which generates a signal indicative of the arithmetic mean of the Doppler frequencies $f_{d_1}$ and $f_{d_2}$, which may be relatively simply implemented with digital logic, is shown in FIG. 3. Although processor 22b does not compute the rms value of $f_{d_1}$ and $f_{d_2}$, the arithmetic mean is, as will be shown, substantially insensitive to mounting angle over the range of practical concern. Referring now to FIG. 3, a clock 50 generates a square wave of frequency $f_R$, which is respectively applied to a suitable frequency multiplier 52, and a timing network 54 and the control terminal of a conventional switch 56. Switch 56 is suitably a mechanical single-pole, double-throw switch or an electronic switch implemented with logic gates, having, in addition to the control terminal, two input terminals and an output terminal. Switch 56 is receptive at the respective input terminals thereof of signals having frequencies indicative of the respective Doppler shifts $f_{d_1}$ and $f_{d_2}$ from mixers 15 and 17. Switch 56 operates to, in effect, connect one or the other of its input terminals to its output terminal in accordance with the signal applied to the control terminal. The output terminal of switch 56 is coupled to a conventional counter 58, the output terminals of which are in turn coupled to a conventional latch 60. The output terminals of latch 60 are in turn coupled to frequency multiplier 52. Frequency multiplier 52 may be any circuit which generates, in response to each pulse applied at one input terminal, a number of pulses in accordance with the number represented by the signals applied at a second set of terminals. Such a frequency multiplier may comprise a digital phase lock loop such as the RCA COS/MOS CD4046, having a counter connected between the VCO and phase comparator thereof.

Figure 4:
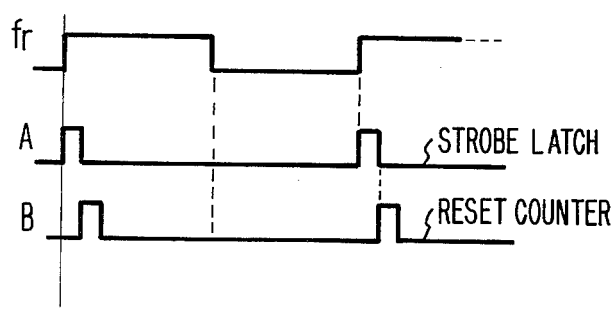
FIG. 4 is a diagram of various waveforms associated with the signal processor of FIG. 3.

Timing network 54, suitably comprising two serially connected one shot multivibrators (not shown) generates first and second trains of timing pulses, A and B, respectively. The output signal ($f_r$) of clock 50 and timing signals A and B are shown in timed relation in FIG. 4. It should be noted that the frequency $f_r$ and the duration timing pulses A and B as shown in FIG. 3 are chosen for ease of illustration. In practice such pulses are actually of very short duration as compared to a cycle of a typical Doppler shift frequency, and frequency ($f_r$). Timing signal A is applied to latch 60, to cause the contents of latch 60 to be loaded into frequency multiplier 52. Control signal B is applied to counter 58 to effect resetting of the counter.

In operation, counter 58 is initially reset to zero. Noting that the duration of timing pulses A and B are very short, as compared to Doppler frequencies $f_{d_1}$ and $f_{d_2}$ and clock frequency $f_r$, during the positive cycle of $f_r$, switch 56 operates to couple the signal of frequency $f_{d_1}$ to counter 58. Thus, during the first half cycle of the clock signal counter 58 will accumulate $f_{d_1}/2f_r$ counts. During the off time of the clock signal, switch 56 operates to couple the signal of frequency $f_{d_2}$ to counter 58, and accordingly, during the second half cycle of clock signals, counter 58 accumulates $f_{d_2}/2f_r$ pulses. Thus, at the end of the clock signal counter 58 contains $(f_{d_1} + f_{d_2})/2f_r$ counts. At the end of the clock signal cycle, timing pulse A causes latch 60 to be loaded with the contents of counter 58. Accordingly, the frequency $f_{out}$ of frequency multiplier 52 is $$f_{out} = f_r \cdot \frac{f_{d_1} + f_{d_2}}{2f_r} = \frac{f_{d_1} + f_{d_2}}{2} \quad (7)$$

Inserting equation 3 and 5 into equation 7

$$f_{out} = fd/2 \, [\cos \theta + \sin \theta] \quad (8)$$

where $$fd = 2f_o V/C \quad (9)$$

It can be shown that for mounting angles near 45° the error term due to changes in angle of incidence, when utilizing the arithmetic mean signal processor of FIG. 3, varies in accordance with $\Delta\theta^2/2$ instead of $\Delta\theta$, as in the case of a speed sensor using a single antenna. The error due to a 1° variation ($\Delta\theta$) in the actual probe signal 29 angle of incidence $\theta$ from a nominal predetermined value of 45° is approximately 0.015%, compared to an error of approximately 1.8% caused by a 1° variation in $\theta$ in a single antenna system with a nominal angle of incidence of 45°. Similarly, a deviation of 10° causes an error of 1.5%, as compared to a 23% error in the single antenna system. Thus, the signal processor 22b generates an output signal indicative of the velocity of vehicle 26 which is substantially independent of probe signal angle of incidence.

Figure 5:
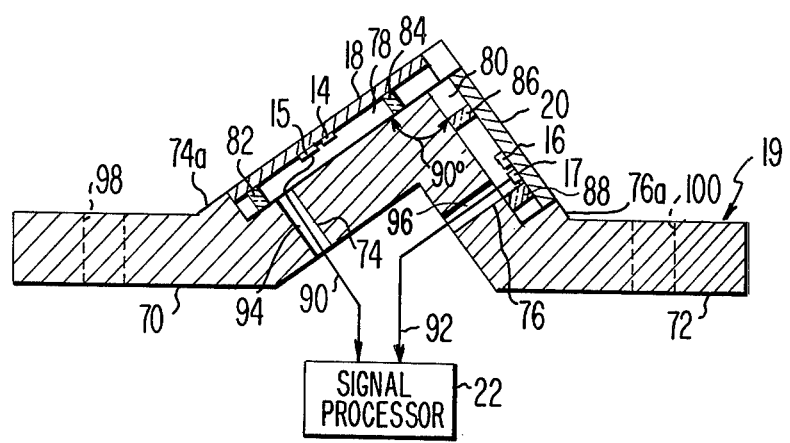
FIG. 5 is a sectional side view of a unitary mounting structure in accordance with the present invention.

Antennas 18 and 20 are affixed to a unitary mounting structure 19 such that radiation patterns 28 and 30 are always at 90° with respect to one another irrespective of deviations from nominal probe signal angles of incidence due to mounting errors or vehicle tilt. A suitable mounting structure 19 for use with corporate-feed printed-circuit antennas is depicted in FIG. 5. Mounting structure 19 is formed of a rigid metallic substance having horizontal portions 70 and 72 diagonal portions 74 and 76. Diagonal portions 74 and 76 are joined such that the respective exterior surfaces thereof, 74a and 76a, are at 90° with respect to each other. Exterior surfaces 74a and 76a are generally planar, but contain recesses 78 and 80, into which printed circuit boards containing antennas 18 and 20 are respectively set. Non-conductive standoffs 82–88 are employed to maintain antennas 18 and 20 at the proper spacing from the interior surfaces of recesses 78 and 80 which operate as ground planes for antennas 18 and 20, shaping thereby radiation patterns 28 and 30 (FIG. 1). Circulators 14 and 16 and mixers 15 and 17 are preferably also contained on the printed circuit board substrates of antennas 18 and 20, and leads 90 and 92 respectively, pass through apertures 94 and 96 in diagonal portions 74 and 76 to couple mixers 15 and 17 to signal processor 22. Horizontal portions 70 and 72 include holes 98 and 100 to facilitate bolting mounting structure 19 to vehicle underside 24 (FIG. 1).

The principal axes of radiation patterns 28 and 30 are thus maintained 90° apart irrespective of the angular positioning of mounting structure 19 on vehicle underside 24. Speed sensor 10 can therefore be installed in vehicle 26 by a relatively simple and inexpensive procedure, without extensive adjustments to insure proper probe signal angle of incidence. The only constraint on the probe signal angles of incidence in speed sensor 10 is that sufficient amounts of backscatter be generated.

It should be appreciated that antennas 18 and 20, in an alternative embodiment, can, be disposed such that the radiation patterns of the frontmost antenna is directed rearward and down and the radiation pattern of the rearmost antenna directed forward and down, to illuminate a common portion of surface 32. The principal axes of the radiation patterns are maintained 90° apart. A single transmitter is utilized such that one antenna receives "backscattered" signals and the other antenna reflected signals. The signals received by the respective antennas are routed to mixers 14 and 16, which are coupled to signal processor 22.

It should be further appreciated that mounting structure 19 can be in the alternative formed of a rigid non-conductive material with conductive plates inserted in 78 and 80 to operate as ground planes for antennas 18 and 20. In addition, signal processor 22 can include means for amplifying the Doppler signals.

What is claimed is:

1. In a Doppler speed sensor of the type for sensing motion of a vehicle parallel to a surface including a signal source for generating a signal of predetermined frequency, an antenna network for radiating said predetermined frequency signal as probe signals in predetermined directions to impinge on said surface, said antenna network further receiving portions of said probe signals reflected from said surface, said reflected signal portions being Doppler shifted in frequency from said predetermined frequency by an amount in accordance with the relative velocity of said signal source on said vehicle with respect to said surface, said speed sensor further including a signal processor responsive to said received signal portions and a signal indicative of said probe signals for producing a signal indicative of said relative velocity, the improvement wherein:

said antenna network comprises first and second antennas and means for maintaining the principle axes of the respective radiation patterns of said first and second antennas disposed 90° apart, said antenna network means including means for mounting said antennas on said vehicle at a mounting angle relative to said vehicle such that said respective probe signals from said antennas impinge on said surface, and said signal processor comprises means, responsive to said received reflected signals from said first and second antennas, for generating a signal indicative of a root mean square value of said Doppler frequency shifts, whereby said signal is independent of any angle of mounting of said antennas to said vehicle and also independent of any angle of tilt of said vehicle.

2. The speed sensor of claim 1 wheren said two antennas are corporate-feed printed-circuit antennas, and said mounting structure comprises:

a rigid generally wedge-shaped unit having at least two conductive exterior surfaces at 90° with respect to one another; and offsetting non-conductive members, affixed to said unit, for coupling said antennas to said unit, each of said antennas being aligned with and parallel to one of said exterior surfaces at a predetermined distance from said one surface, whereby said exterior surfaces provide a ground plane for said antennas.

3. The signal processor of claim 1 wherein said signal processor comprises:

means for generating a timing signal having a predetermined timing frequency;

switching means, responsive to said timing signal and said received signal portions, for providing a signal having a frequency indicative of a frequency shift of a first one of said received signal portions during a first half of each cycle of said timing signal, and indicative of the frequency shift of the second received signal portion during the second half of each timing cycle;

counter means, responsive to said switching means output signal, for generating a count indicative of a cumulative number of cycles of said switching means signal over said timing signal; and processor means for generating an output signal indicative of a root mean square of said frequency shifts and said count.

4. In a Doppler speed sensor of the type for sensing motion of a vehicle parallel to a surface including a signal source for generating a signal of predetermined frequency, an antenna network for radiating said predetermined frequency signal as probe signals in predetermined directions to impinge on said surface, said antenna network further receiving portions of said probe signals reflected from said surface, said reflected signal portions being Doppler shifted in frequency from said predetermined frequency by an amount in accordance with the relative velocity of said signal source on said vehicle with respect to said surface, said speed sensor further including a signal processor responsive to said received signal portions and a signal indicative of said probe signals for producing a signal indicative of said relative velocity, said antenna network comprising first and second antennas and means for maintaining the principle axes of the respective radiation patterns of said first and second antennas disposed 90° apart, the improvement wherein said signal processor comprises:

means for generating a timing signal having a predetermined timing frequency;

switching means, responsive to said timing signal and said received signal portions, for providing a signal having a frequency indicative of a frequency shift of a first one of said received signal portions during a first half of each cycle of said timing signal, and indicative of the frequency shift of the second received signal portion during the second half of each timing cycle;

counter means, responsive to said switching means output signal, for generating a count indicative of the cumulative number of cycles of said switching means signal over said timing cycle; and processor means for generating an output signal having a frequency equal to said count multiplied by said timing frequency.

5. The speed sensor of claim 4 wherein said processor means comprises a frequency multiplier means for generating an output signal having a frequency equal to said count multiplied by said timing frequency, said output signal being indicative of the arithmetic mean of said frequency shifts.

* * * * *

UNITED STATES PATENT AND TRADEMARK OFFICE
CERTIFICATE OF CORRECTION

PATENT NO. : 4,107,680

DATED : August 15, 1978

INVENTOR(S): Gerald Stanley Kaplan

It is certified that error appears in the above-identified patent and that said Letters Patent is hereby corrected as shown below:

Column 3, line 35, equation (5) "= θ" should read -- - θ --; and "$\underline{\underline{V}}$" should read -- V --.

Signed and Sealed this

Twenty-seventh Day of February 1979

[SEAL]

Attest:

RUTH C. MASON
Attesting Officer

DONALD W. BANNER
Commissioner of Patents and Trademarks